United States Patent [19]
Carpenter

[11] 3,931,637
[45] Jan. 6, 1976

[54] DUAL CHANNEL AUTOMATIC PICTURE SHARPNESS CONTROL

[75] Inventor: David H. Carpenter, Fairfield, Conn.

[73] Assignee: Matsushita Electric Corporation of America, Secaucus, N.J.

[22] Filed: June 14, 1974

[21] Appl. No.: 479,199

Related U.S. Application Data
[63] Continuation-in-part of Ser. No. 369,525, June 13, 1973, abandoned.

[52] U.S. Cl. ............... 358/38; 358/39; 358/40
[51] Int. Cl.[2] ........................................ H04N 9/02
[58] Field of Search ........... 358/36, 37, 38, 39, 40; 178/7.3 R, 7.5 R, DIG. 19

[56] References Cited
UNITED STATES PATENTS

| | | | |
|---|---|---|---|
| 2,514,112 | 7/1950 | Wright et al. | 178/DIG. 19 |
| 2,584,332 | 2/1952 | Crooker et al. | 178/DIG. 19 |
| 2,717,931 | 9/1955 | Duke | 178/DIG. 19 |
| 2,910,528 | 10/1959 | Petersen | 358/38 |
| 3,706,846 | 12/1972 | Siwko | 178/7.3 R |

Primary Examiner—George H. Libman
Assistant Examiner—George G. Stellar

[57] ABSTRACT

A video shaping control circuit is utilized to control a video shaping network in a television receiver for controlling the sharpness of the image displayed on a television picture tube. The video shaping control circuit is responsive to an AGC signal such that the sharpness of the displayed image is reduced when the receiver is receiving a weak signal thereby reducing snow or other noise which would otherwise be displayed on the picture tube.

5 Claims, 14 Drawing Figures

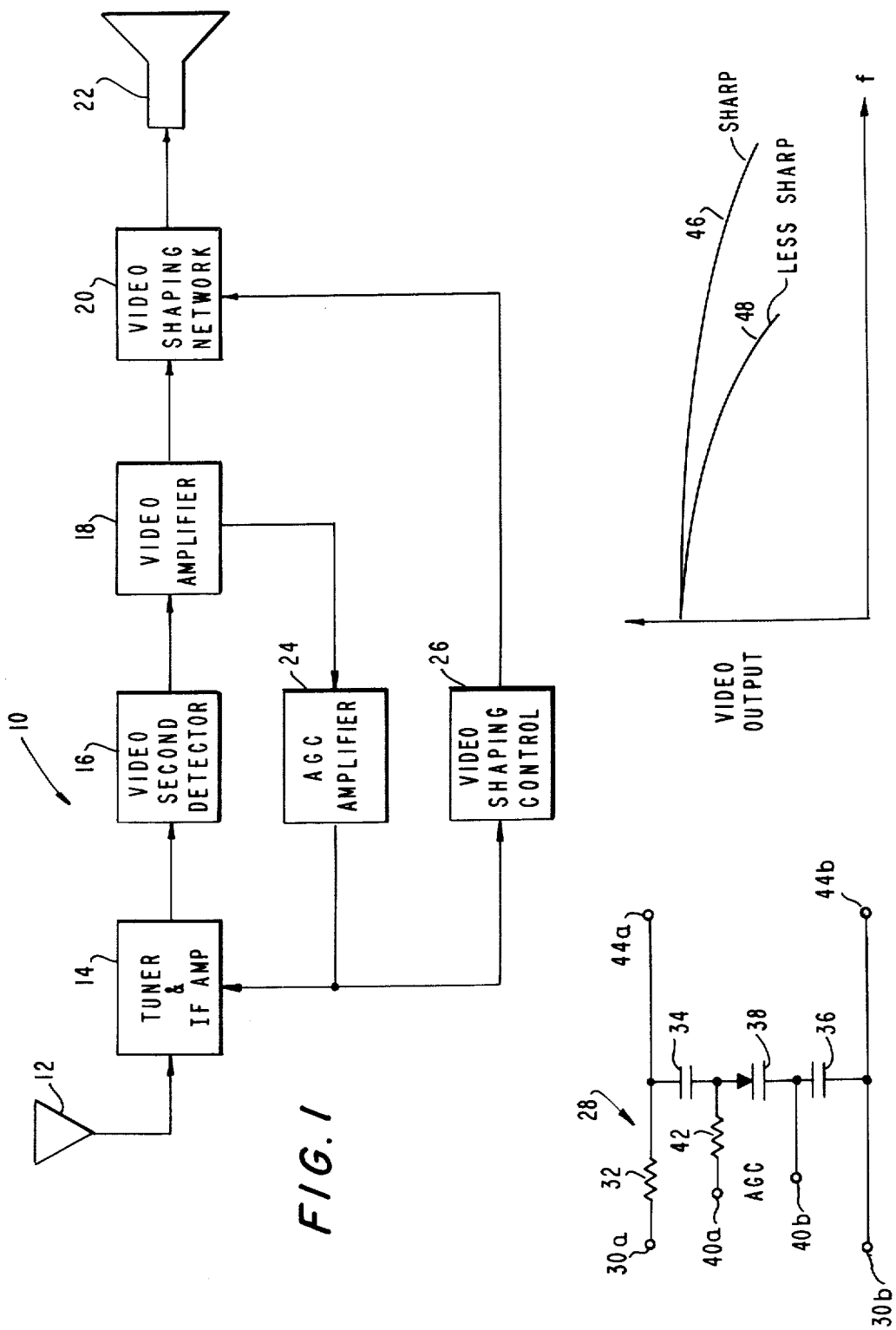

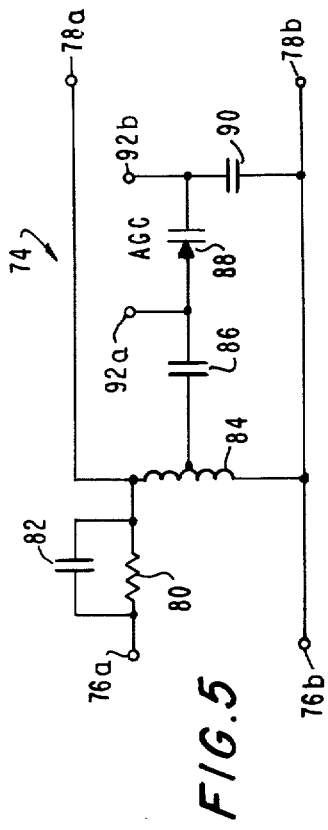
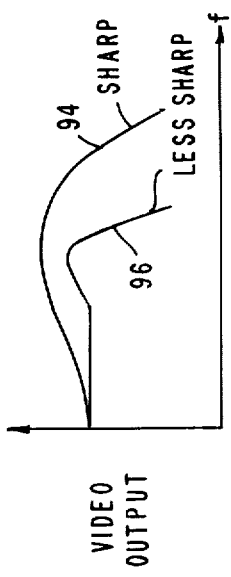
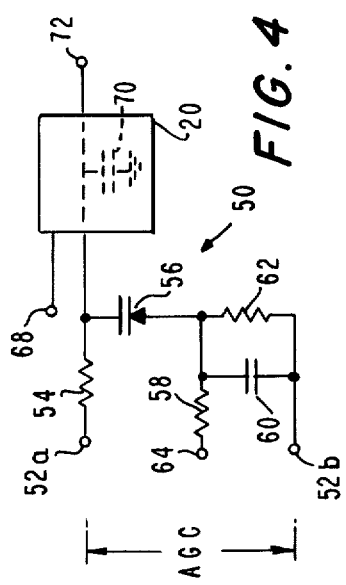
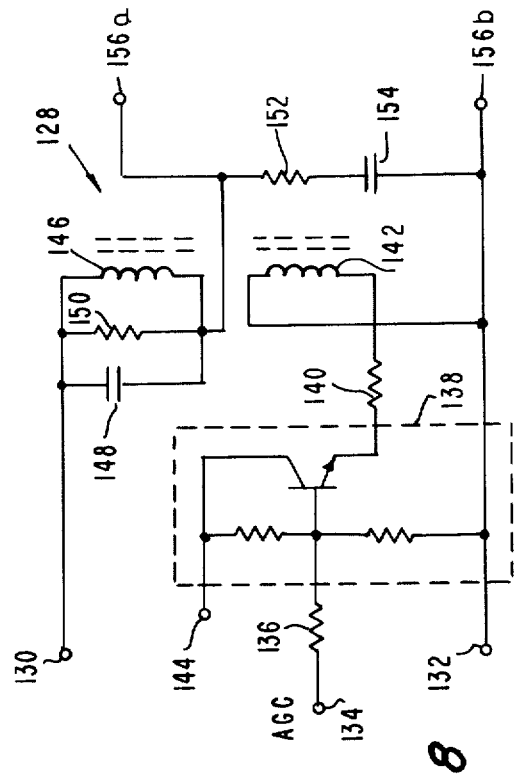
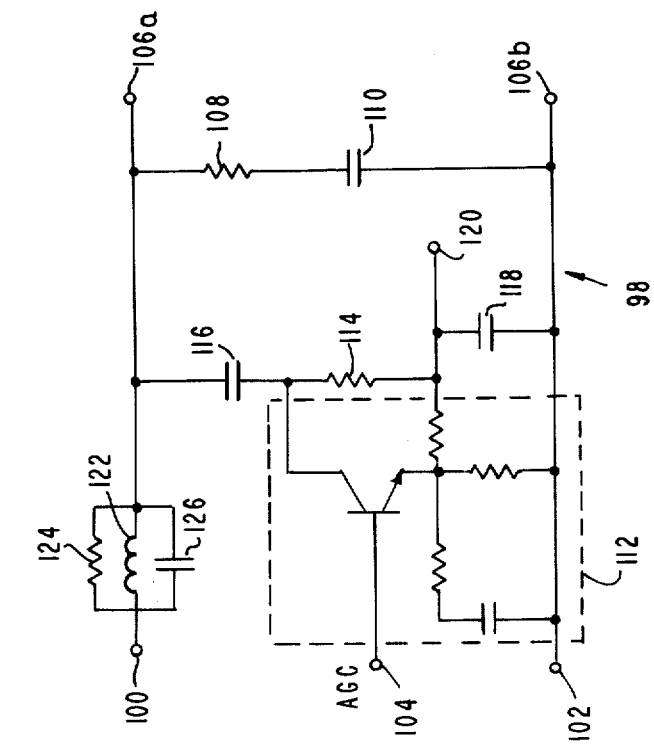

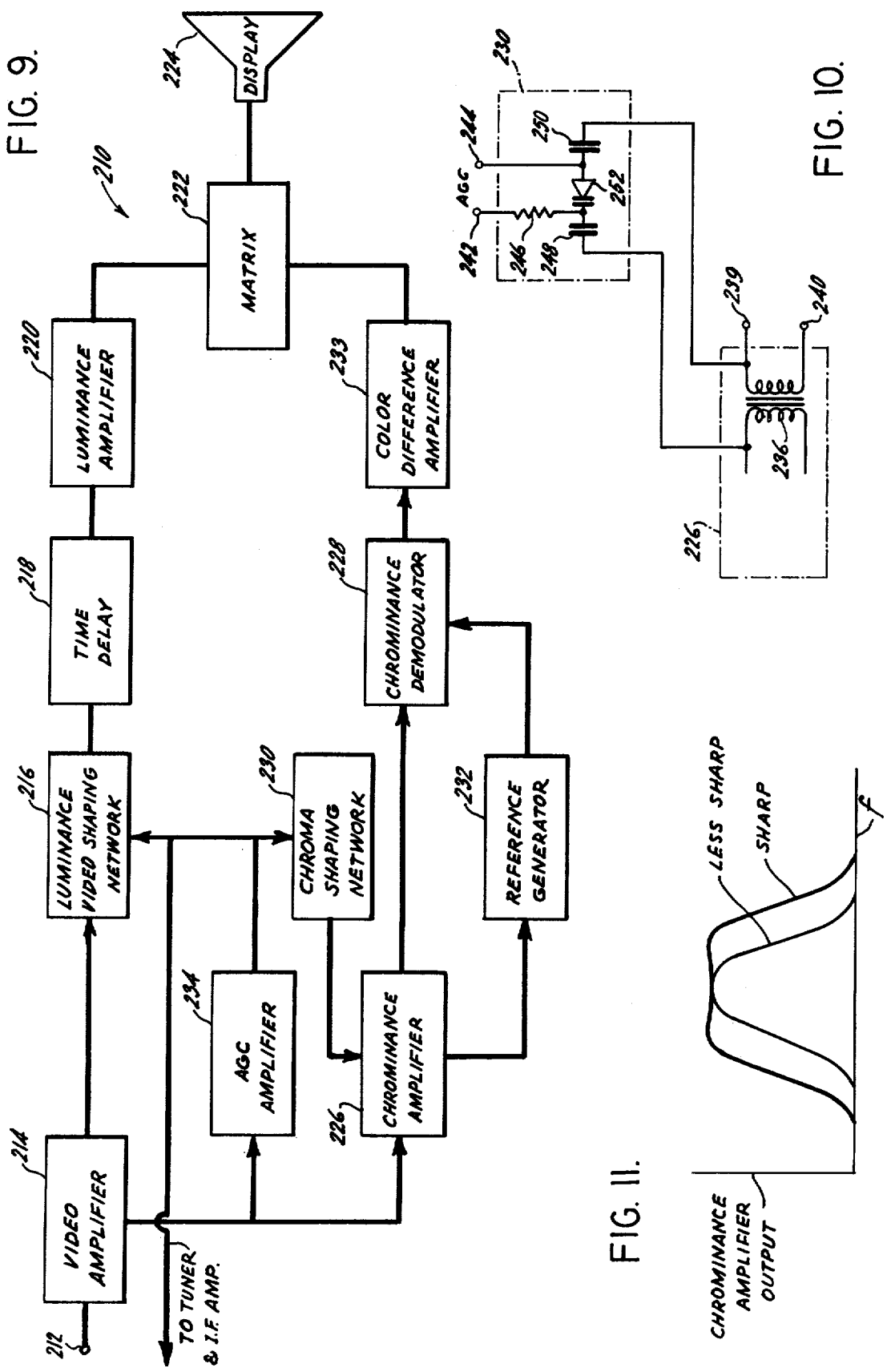

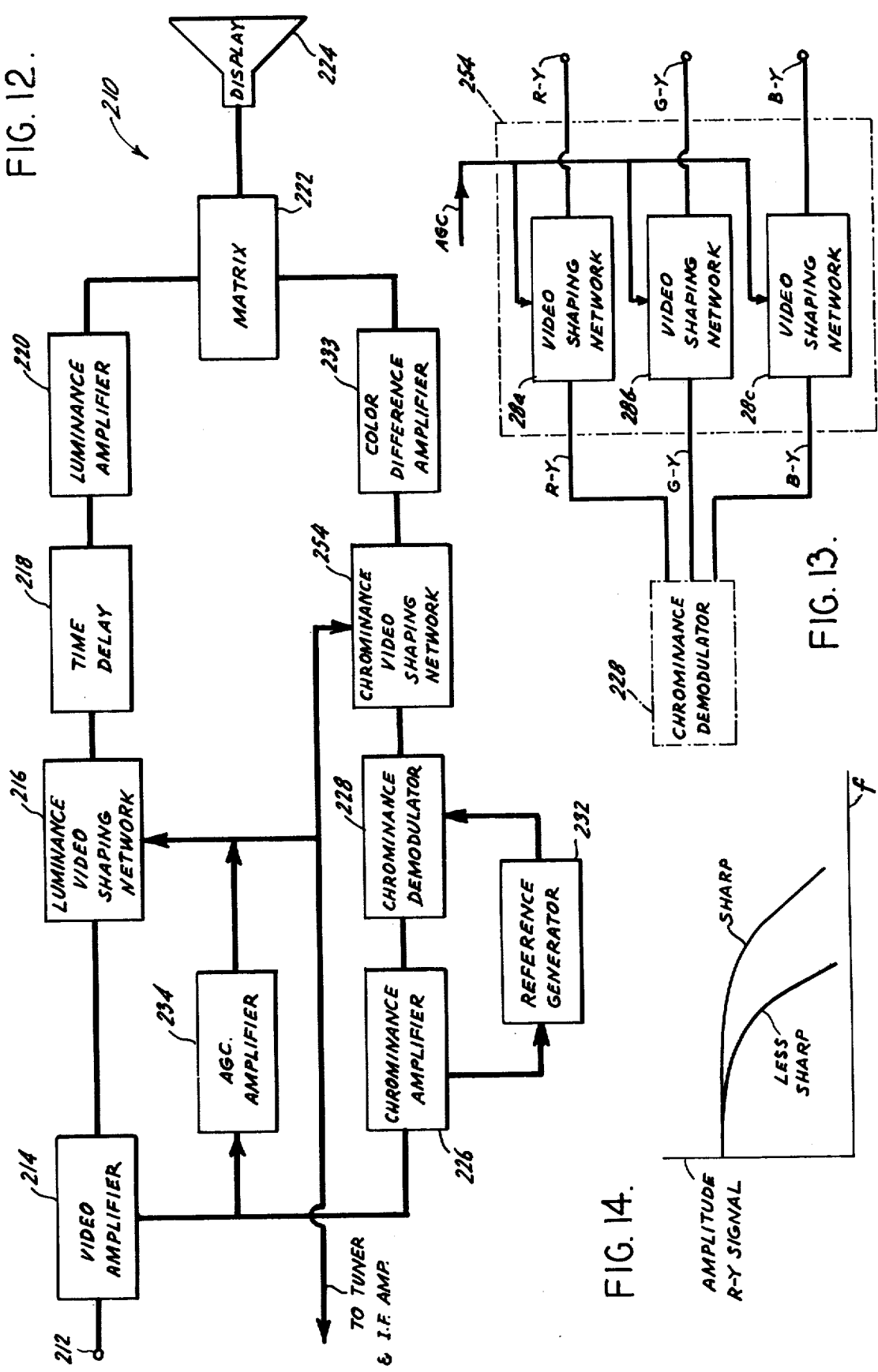

DUAL CHANNEL AUTOMATIC PICTURE SHARPNESS CONTROL

This application is a continuation-in-part application of prior co-pending application Ser. No. 369,525 filed on June 13, 1973 in the name of David H. Carpenter for AUTOMATIC PICTURE SHARPNESS CONTROL, now abandoned.

This invention relates generally to television receivers and, more particularly, to an automatic picture sharpness control for use in a television receiver.

Video shaping networks are generally well-known in the art and are included in conventional television receivers to enable the viewer, within certain limits, to change the "sharpness" or clarity of the television image displayed on the television picture tube. Specifically, although all television picture tubes have specific "definition" limits, (that is, are somewhat limited in the ability to reproduce the details of the original image or scene) video shaping networks allow the television viewer some control over the sharpness of the viewed image by allowing the manual adjustment of the image sharpness to the viewer's own taste.

A problem in conventional television receivers having video shaping networks is the inability of these systems to compensate for the strength or weakness of the received signal. Specifically, although it may be advantageous for the video shaping network to present a sharp image when the signal received by the television receiver is strong, the video shaping network should not operate at its normal optimum when the received signal is weak since the video shaping network then enhances the undesirable characteristics of the weak signal. All video signals include random electrical noise which is produced in the propagation of the signal, in the transmitter and in the receiver. High frequency noise appears as "snow" on the displayed image presented at the picture tube which snow is enhanced when the received video signal is weak. Thus, although it is generally desirable for the video shaping network to function to provide a sharp picture when the television receiver is receiving a strong signal, it is less than desirable for the video shaping network to provide a sharp picture when a weak signal is received since the sharpness merely accentuates the noise or snow which is displayed on the picture tube.

One way of decreasing the snow produced by random electrical noise and, in particular, high frequency noise, is to control the sharpness of the image on the television picture tube. Specifically, it has been found that the visibility or perceptibility of the snow can be reduced by reducing the sharpness of the television picture tube. Although this also decreases the sharpness of the overall picture, it has been found that the degradation of the sharpness of the overall picture is less offensive than the existence of highly visible snow in the picture. Thus, the degradation in sharpness of the overall picture when the weak signal is being received is more than compensated by the decrease in snow or noise which would otherwise be displayed and perceived on the television picture tube. On the other hand, when the received signal is "strong", the television picture tube may be kept at its optimum sharpness.

The problem of high frequency noise interference with color television signals is particularly difficult to solve. In conventional color television transmission, a color television camera is utilized to provide a red video signal, a green video signal and a blue video signal responsive to the scene scanned by the color camera. The red video signal is responsive to the red content of the scene being scanned by the color camera, the green video signal is responsive to the green content of the scene being scanned and the blue video signal is responsive to the blue content of the scene being scanned. In a compatible color television system, these three signals, corresponding to the red, green and blue components of a picture as viewed by the television camera, are added prior to transmission in predetermined portions to form a luminance signal. The luminance signal is representative of the brightness distribution in the picture and it is this signal which is displayed on a conventional black and white picture tube in a black and white television receiver. In addition to the luminance signal, color difference signals between the red, green and blue video signals and the luminance signals are formed prior to transmission and processed to provide a chrominance signal. The amplitude of the chrominance signal is responsive to the saturation of the transmitted image, i.e., the intensity of coloration. The phase of the chrominance signal is representative of the hue of the transmitted image. The luminance and chrominance signals are combined to form a color video signal which is transmitted by the television transmitter and received by the television receiver. In addition to the luminance and chrominance signals, a "burst" color reference signal is also transmitted which is utilized to provide a reference phase for the detection of the chrominance signal in the television receiver.

In the conventional television receiver, the luminance and chrominance signal components of the transmitted video signal are separated. The chrominance signal is demodulated, usually by synchronous detectors, to provide three color difference signals, i.e., red minus luminance signal (hereinafter referred to as "R-Y"), blue minus luminance signal (hereinafter referred to as "B-Y") and green minus luminance signal (hereinafter referred to as "G-Y"). These color difference signals are then combined with a luminance signal to produce the red, green and blue video signals. These signals are then applied to a cathode-ray display tube generally including a viewing screen having a multiplicity of red-emitting, green-emitting and blue-emitting phosphor elements arranged on the inner surface of the face plate of the tube in a predetermined array. These phosphor elements are excited by electron beams controlled by the individual color video signals to produce a color image representative of the transmitted scene.

As explained heretofore, the high frequency interference producing "snow" can be decreased by controlling the sharpness of the image on the television tube by decreasing the high frequency response of the video signal when the receiver receives a weak video signal. In color television signals, the high frequency noise affects both the luminance and chrominance signals and the noise in both signals must be regulated to produce a pleasing display. It has been suggested that the high frequency response of the video signal could be controlled at the input or IF stages of a television receiver. This however would be ineffective and detrimental to a composite color video television signal since the entire color information is contained in the high frequency portion of the composite video signal and any decrease in the high frequency portion of the signal would severely attenuate the color information resulting in extremely weak color and desaturation of large color areas on the ultimate color display.

Accordingly, it is a broad object of the present invention to provide a television receiver which provides a pleasing image under weak signal conditions. A more specific object of the invention is to provide a television receiver in which the sharpness of the displayed image is automatically controlled to reduce the visibility of snow or other noise when the receiver is receiving a weak signal.

It is a specific object of the invention to reduce the noise by controlling the frequency response of the video signal subsequent to its detection in the video detector of the receiver.

Another specific object of the invention is to provide separate frequency control for the luminance and chrominance signal components of a composite color video signal to provide a reduction of the noise of a weak color video signal.

In accordance with illustrative embodiments demonstrating objects and features of the present invention, there is provided a television receiver having an antenna and a conventional tuner and IF amplifier stage which is coupled to a conventional video second detector. The output of the video second detector is coupled to a video amplifier which is coupled to a video shaping network. The output of the video amplifier also provides an AGC signal which, as in conventional television receivers, is utilized to control the tuner and IF amplifier stage. The AGC signal, which is responsive to the strength of the signal received by the television receiver, is also utilized to control a video shaping control circuit which functions to control a video shaping network. The video shaping control circuit advantageously includes a variable impedence element which is responsive to the AGC signal to control the frequency response of the video shaping network.

Other objects, features and advantages of the present invention will be understood by reference to the following detailed description of various presently preferred by nonetheless illustrative embodiments of the present invention, when taken in conjunction with the accompanying drawings, wherein:

FIG. 1 is a block diagram of the video portion of a television receiver according to the present invention;

FIG. 2 is a circuit diagram of a video shaping network and a video shaping control circuit according to the present invention;

FIG. 3 is a graph of the output characteristics of the circuit of FIG. 2;

FIG. 4 is a circuit diagram of a video shaping control circuit according to another embodiment of the present invention;

FIG. 5 is a circuit diagram of the video shaping network and the video shaping control circuit according to another embodiment of the present invention;

FIG. 6 is a graph of the output characteristics of the circuit of FIG. 5;

FIG. 7 is a circuit diagram of a video shaping network and a video shaping control circuit according to another embodiment of the present invention; and FIG. 8 is a circuit diagram of a video shaping network and a video shaping control circuit according to another embodiment of the present invention.

FIG. 9 is a block diagram of part of the video portion of a television receiver modified in accordance with this invention for control of the luminance and chrominance signals;

FIG. 10 is a schematic representation of the video shaping control for controlling the frequency response of the chrominance amplifier in accordance with this invention;

FIG. 11 is a graphical representation of the output signal from the chrominance amplifier controlled in accordance with this invention;

FIG. 12 is a block diagram of part of the video portion of a color television receiver modified in accordance with another embodiment of this invention for control of the luminance and chrominance signals;

FIG. 13 is a block diagrammatic representation of the chrominance demodulator and video shaping networks for controlling the color difference components of the chrominance signal according to the invention;

FIG. 14 is a graphical representation of one of the color difference signals, in accordance with this invention.

Referring to the drawings and, more particularly, to FIG. 1 thereof, the video stages of a television receiver according to the present invention is generally designated 10. Video receiver 10 includes a conventional antenna 12 for receiving a conventional television signal. The television signal is coupled to a conventional tuner and IF amplifier stage, 14, the output of which is then coupled to a video second detector 16. Video second detector 16 is coupled to a conventional video amplifier 18 having two outputs. One of the outputs from video amplifier 18 is coupled to a video shaping network 20 which, in turn, is connected to a conventional television picture tube 22. The other output from video amplifier 18 is coupled to a conventional AGC amplifier, 24, the output of which is coupled to tuner and IF amplifier stage 14. As is known in the art, AGC amplifier 24 provides an AGC signal, responsive to the strength of the received video signal, which is utilized to control tuner and IF amplifier stage 14 to maintain the amplitude or strength of the received signal constant. By way of example, the output from AGC amplifier 24 may increase as television receiver 10 receives a stronger video signal, with the increased AGC signal being utilized to control the gain of tuner and IF amplifier stage 14. In a similar manner, the AGC signal output from AGC amplifier 24 may decrease as the received signal gets weaker.

The circuit blocks or stages heretofore described are well-known in the art, and, as described up to this point, television receiver 10 is conventional. Thus, the stages of television receiver 10 function to recover from the received modulated RF signal the video signal which is amplified and applied to picture tube 22. Television receiver 10 may be a black and white television receiver or, in the alternative, may be a color television receiver. In the latter case, video amplifier 18 and video shaping network 20 function to process the "luminance" signal or component of the composite color signal and an appropriate delay network (not shown) may be inserted before television picture tube 22, and appropriate video shaping networks are provided for processing the "chrominance" signal or component of the composite color signal as will be described in greater detail below.

As explained hereinbefore, one commonly observed interference or spurious component of the received video signal is random electrical noise which is produced in the transmitter, the television receiver and the propagation path between the transmitter and receiver. Frequently, this random noise and, in particular, random electrical noise at high frequencies, manifests itself as "snow" on the image displayed on the picture tube. This snow is particularly noticeable when the television receiver is receiving a weak signal, i.e., when the signal to noise ratio is low. Television receiver 10 includes a video shaping control circuit, generally designated 26, which is utilized to control video shaping network 20 in order to reduce the "sharpness" of the image on tube 22 when the received signal is weak. Video shaping control circuit 26 is responsive to the output from AGC amplifier 24 which is coupled to the control circuit. Thus, the AGC signal is utilized to control video shaping control circuit 26 which, in turn, controls the sharpness of the image at television picture tube 22 through video shaping network 20. When a strong signal is being received in the television receiver, video shaping control circuit 26 functions to control video shaping network 20 such that the sharpness of picture tube 22 is maintained at an optimum level. On the other hand, when the signal received by television receiver 10 is weak, that is, when the signal to noise ratio is low, the AGC controlled video shaping control circuit 26 functions to decrease the sharpness of television picture tube 22 by controlling video shaping network 20 thereby reducing the snow which would otherwise be visible on the television picture tube.

Referring to FIG. 2, a circuit which incorporates a typical video shaping network 20 and video shaping control circuit 26 according to one embodiment of the present invention is generally designated 28. Circuit 28 includes input terminals 30a, 30b which are adapted to receive the output signal from video amplifier 18. This signal is coupled, by way of a resistor 32, to a pair of series connected capacitors 34, 36 and a voltage dependent impedance element, such as a voltage dependent capacitance impedance. By way of example, the voltage dependent capacitance may be a variable capacitance diode 38 of any type generally known in the art adapted to provide decreasing capacitance as the voltage across diode element 38 increases. The capacitance of diode element 38 is dependent upon the AGC signal form AGC amplifier 24. Specifically, the AGC signal from AGC amplifier 24, is applied to terminals 40a, 40b, enabling this voltage to be impressed, by way of a resistor 42, across the diode element. The output from circuit 28 is provided at output terminals 44a, 44b and this signal is connected to television picture tube 22.

The operation of circuit 28 may be appreciated by reference to FIG. 3 which shows the variation in video output or voltage output at terminals 44a, 44b as a function of frequency and the AGC signal. Specifically, capacitors 34 and 36 (See FIG. 2) are chosen to have large capacitance value as compared to the highest capacitance value of diode element 38, and, therefore, capacitors 34, 36 merely block dc voltage. When the signal received at television receiver 10 is "strong", the AGC signal is at an increased level and the AGC signal, which may be either a voltage or a current signal, is impressed at AGC terminals 40a, 40b. This causes the capacitance of diode element 38 to be at a relatively low value. As indicated by curve 46, the pass-band of circuit 28 is thus relatively wide and high frequency signals are passed by the circuit to television picture tube 22 and picture tube 22 is controlled to provide a sharp display or sharp picture image. On the otherhand, when television receiver 10 is receiving a "weak" signal, the AGC signal impressed across terminals 40 a, 40b is decreased, causing the capacitance of diode element 38 to increase. As indicated by curve 48, this causes the pass-band of circuit 28 to decrease, i.e., the high frequency signals are not impressed on picture tube 22. As a result, the sharpness of the displayed image provided at television picture tube 22 is reduced.

Referring to FIG. 4, a video shaping control circuit according to another embodiment of the invention is generally designated 50. Video shaping control circuit 50 includes terminals 52a, 52b which receive the AGC signal from AGC amplifier 24. The AGC signal is passed, via a resistor 54, to a voltage dependent impedance element, such as variable capacitance diode 56. A resistor 58 and a parallel connected capacitor 60 and resistor 62 are adapted to be connected to a source of dc supply connected to a termunal 64 for providing a dc bias for diode element 56. As with the circuit illustrated in FIG. 2, diode element 56 provides a variable capacitance which is responsive to the strength of the AGC signal, i.e., the capacitance of diode element 56 is inversely proportional to the strength of the AGC signal. Diode element 56 is coupled to video shaping network 20 in order to control the sharpness of television picture tube 22. Video shaping network 20 may be of any well-known type and, for example, may be a network similar to that included in television Model TR-542 manufactured by Matsushita Electrical Industrial Co., Ltd. of Osaka, Japan. Specifically, video shaping network 20 is adatped to receive, via a terminal 68, the output signal from video amplifier 18 (See FIG. 1). Video shaping network 20 may also include a capacitor 70 which determines the response, i.e., by controlling the pass-band, of the signal provided at an output terminal 72, which output terminal is connected to the television picture tube. Diode element 56 is connected in parallel with capacitor 70 and, depending on the parallel combination of capacitor 70 and the capacitance of diode element 56 (the latter depending on the strength of the AGC signal), the characteristics of the signal at terminal 72 and, therefore, the sharpness of the displayed image is controlled. As with the embodiment according to FIG. 2, when the signal received by television receiver 10 is "strong", television picture tube 22 is controlled to be at its optimum sharpness; when the received signal is "weak", the AGC signal varies circuit 50 which; by controlling shaping network 20, decreases the sharpness of the displayed image thereby reducing the perceptible snow.

FIG. 5 illustrates a circuit generally designated 74 including a video shaping network and a video shaping control circuit according to another embodiment of the invention. Circuit 74 includes input terminals 76a, 76b adapted to receive the signal from video amplifier 18 and output terminals 78a, 78b for applying the signal from circuit 74 to television picture tube 22. Circuit 74 includes a parallel connected resistor 80 and capacitor 82 which are connected between input terminal 76a and output terminal 78a. An inductor or similar inductive impedance device 84 is connected between output terminal 78a (the juncture of resistor 80 and capacitor 82) and input terminal 76b. A variable tap from the center of inductor 84 is connected, in series, to a capacitor 86, a voltage dependent impedance element, such as a variable capacitance diode 88, and another capacitor 90. Circuit 74 also includes terminals 92a, 92b which are adapted to receive the AGC signal from AGC amplifier 24, which signal is impressed across diode element 88.

The output characteristics of circuit 74 (FIG. 5) is illustrated in FIG. 6. Specifically, FIG. 6 shows the output signal at terminal 78a, 78b as a function of frequency, with the AGC signal as a parameter. As indicated by curve 94 of FIG. 6, when the signal received by television receiver 10 is "strong", the AGC signal applied to terminals 92a, 92b of circuit 74 decreases the capacitance of element 88 which enables television picture tube 22 to present a sharp image. When the perceived signal is "weak", the AGC signal decreases which, in turn, increases the capacitance of diode element 88 thereby providing the output characteristic of curve 96. As indicated in FIG. 6, curve 96 attenuates high frequency signals, such as high frequency noise, thereby controlling television picture tube 22 to provide a less than optimum sharp picture but a picture wherein the random electrical noise or snow is not readily visible.

FIG. 7 illustrates yet another embodiment according to the present invention in which an AGC signal provided from AGC amplifier 24 is utilized to control the sharpness of the television picture. In FIG. 7 circuit 98 includes an input terminal 100, a common terminal 102 and a terminal 104 adapted to receive the AGC signal. The output of circuit 98 is provided at terminals 106a, 106b which is taken across a resistor 108 and a capacitor 110. The AGC signal from AGC amplifier 24 is coupled to terminal 104 and is utilized to control a conventional dc amplifier, generally designated 112, the output of which is utilized to control a voltage dependent impedance, such as a voltage dependent resistor 114. Voltage dependent resistor 114 is connected, at one side thereof, to a capacitor 116 and, at the other side thereof, to another capacitor 118. Circuit 98 also includes terminal 120 adapted to be connected to an appropriate source of dc supply. A series connected inductor 122, resistor 124 and capacitor 126 are connected between input terminal 100 and output terminal 106a.

In operation, the AGC signal applied to terminal 104 controls dc amplifier 112 to vary the voltage across voltage dependent resistor 114 thereby varying the resistance thereof. As the resistance value of resistor 114 changes, it alters the damping of inductor 122 at high video frequencies and also changes the high frequency roll-off characteristics of circuit 98. Thus, circuit 98 operates in much the same general manner as the embodiments heretofore described the AGC signal is utilized to control a variable impedance which, in turn, controls the output characteristics of the circuit, for controlling the sharpness of the television picture tube.

FIG. 8 illustrates another embodiment according to the present invention in which a circuit, generally designated 128, is utilized to control the sharpness of television picture tube 22 responsive to the strength or weakness of the signal received by television receiver 10. Circuit 128 includes an input terminal 130 for receiving the output signal from video amplifier 18. This signal is connected between input terminal 130 and a common terminal 132. The AGC signal from AGC amplifier 24 is connected to a terminal 134 and this signal is coupled, via a resistor 136, to a dc amplifier, generally designated 138. The output from dc amplifier 138 is coupled, via a resistor 140, to the control winding 142 of a saturable reactor of the like. The dc amplifier 138 may be connected to an appropriate source of dc supply, such as via terminal 144. The output from dc amplifier 138 varies control winding 142 which varies the power winding or inductor 146 magnetically coupled thereto. Winding 146 is connected in parallel with a capacitor 148 and a resistor 150 which are connected, at one end thereof, to input terminal 130 and, at the other end thereof, to a series connected resistor 152 and capacitor 154. The output of circuit 128 is provided at output terminals 156a, 156b, which is taken across resistor 152 and capacitor 154, and the output signal is connected to television picture tube 22 to vary the sharpness thereof.

In operation, the dc output from the dc amplifier 138, which is responsive to the AGC signal, is utilized to control winding 142 which, in turn, controls the inductance of winding 146. Winding 146 forms, along the capacitors 148, 154 and resistors 150, 152, the video shaping network. Thus, variation in the inductance of winding 146 controls the frequency response of the video shaping network which, in turn, controls the sharpness of the image provided at television picture tube 22. The output characteristics of the video shaping network is controlled such that television picture tube 22 provides optimum sharpness when the television receiver is receiving a "strong" signal and is varied such that the sharpness of the picture tube is automatically varied when the television receiver is receiving a "weaker" signal, thereby reducing the visibility of snow or the like.

Control of the frequency response of the video signal after demodulation in the video receiver according to this invention permits the separate control of the luminance and chrominance signal components of a composite color video signal to effectively reduce the high frequency noise content of both signals. Referring now to FIG. 9, there is shown the video portion of a color television receiver according to the present invention, generally designated 210. Color television receiver 210 includes conventional input circuitry including an antenna, IF stages and video demodulator for detecting and demodulating the television signal transmitted from a color television transmitter. The demodulated video signal which appears at terminal 212 is the composite video signal which includes both luminance and chrominance signal components.

The composite video signal, is coupled to a video amplifier 214. According to the invention, the luminance signal output of video amplifier 214 is coupled to luminance video shaping network 216, which is operated to control the frequency response of the luminance signal in accordance with the strength of the received composite video signal as will be explained in greater detail below. The output of the luminance video shaping network is applied to time delay circuit 218 and then to conventional luminance amplifier 220. The output from luminance amplifier 220 provides the luminance component of the composite video signal, modified by the video shaping network to reduce the luminance noise for weak received signals, and in a monochromatic television receiver, provides the sole video information for display on the television picture tube. In color television receivers, the luminance signal is combined with color difference signals, for example, in a matrix or summing network 222, for providing the red, green and blue color video signals which are coupled to a color television picture tube or similar display device 224.

The chrominance signal output from video amplifier 214 is coupled to a conventional chrominance amplifier 226 which passes the chrominance portion of the composite video signal to a chrominance demodulator 228. In accordance with the invention, the frequency content of the output of the chrominance amplifier is controlled by the chroma video shaping network 230, to reduce the high frequency noise component of the chrominance signal, as will be explained in greater detail below. As is generally understood in the art, a reference generator 232 responsive to the reference or "burst" portion of the received signal is utilized to provide a reference phase signal which is used to demodulate the color difference signals in conventional chrominance demodulator 228. The output from chrominance demodulator 228 is a series of color difference signals, R-Y, G-Y, and B-Y, which are amplified in color difference amplifier 233 before being coupled to matrix 222 where they are combined with the luminance signal to provide the red video signal, the green video signal, and the blue video signal which control picture tube 224.

Another output from video amplifier 214 provides a conventional AGC signal which has a signal level directly related to the strength of the composite video signal. The AGC signal is coupled to AGC amplifier 234 and the output coupled to the tuner and IF amplifier stages of the television receiver (not shown) to maintain the amplitude or strength of the received signal constant. The output of the AGC amplifier is also coupled to video shaping networks 216 and 230 which separately control the frequency response of the luminance and chrominance signals in accordance with the strength of the received composite signal and under the control of the AGC signal from amplifier 234.

Video shaping network 216 can be any circuit for effecting the frequency response of the luminance signal under the control of the AGC signal so that the higher frequency components of the luminance signal are attenuated when the AGC signal decreases as a result of the decrease in signal strength of a received signal. This shaping network, in particular, can be any of the shaping networks previously described for controlling the frequency response of the signals under the control of the AGC signal and the operation is the same as described above and need not be explained again for the sake of brevity.

Control of the chrominance signal which is provided by chroma video shaping network 230 can best be understood by reference to FIG. 10. Typically, the output stage of the chrominance amplifier 226 contains a doubly tuned band pass transformer 236 which has a pass band sufficient to pass the chrominance component of the video signal. The output of the chrominance amplifier appears at terminals 239 and 240 which are coupled to chrominance demodulator 228. The video shaping control 230 includes input terminals 242, 244 which are adapted to receive the AGC signal from AGC amplifier 234. The AGC signal is coupled by way of resistor 246 to a pair of capacitors 248, 250 which block DC and a voltage dependent variable capacitor element 252, such as described above. The capacitance of capacitor 252 is dependent upon the AC voltage impressed across the element. The output of video shaping network 230 is coupled between the primary and secondary windings of tuned transformer 236 to vary the frequency response pass band of the tuned transformer in response to the AGC signal.

The operation of this circuit can be seen with reference to FIG. 11. With a strong signal and a high AGC signal level, the capacitance of capacitor 252 is relatively low and the video shaping network 230 has little effect upon the frequency response of tuned transformer 236. The pass band of the tuned transformer remains relatively wide thereby passing the high frequency components of the chrominance signal to the chrominance demodulator. When the television signal is weak, the AGC signal level decreases producing an increase in the capacitance of element 252. As indicated in FIG. 11, the bandwidth of tuned transformer is thereby decreased and the high frequency components of the chrominance signal attenuated to reduce the high frequency noise in the chrominance signal. Separate processing of the chrominance and luminance signal in this manner eliminates only the high frequency components of the luminance and chrominance signals. The resulting image displayed on the display device although less sharp with a weak signal is still more pleasing to the viewer due to a decrease in the overall noise.

Referring now to FIG. 12, there is shown a color television receiver modified in still another way, in accordance with the invention, for controlling the frequency response of the luminance and chrominance signals. In this figure, which contains elements which are common to those shown in FIG. 9, the common elements are indicated by the same reference numerals. The composite color video signal appears at terminal 212 and is applied to video amplifier 214 where it is separated into luminance and chrominance components. The luminance component is applied to video shaping network 216 under the control of the AGC signal from AGC amplifier 234 to vary the high frequency response of the signal when a weak signal is received as explained above. The luminance signal is passed to the time delay network 218 and luminance amplifier 220 to matrix 222 where it is mixed with the color difference signals to produce the color signals to be applied to display tube 224.

The chrominance signal is applied to chrominance amplifier 226 and from there to chrominance demodulator 228 which also has as an input a reference signal from reference generator 232. The output of the chrominance demodulator is the three color difference signals, R-Y, G-Y and B-Y and they are applied to video shaping network 254 where the frequency response of the individual color difference signals are controlled in accordance with the strength of the AGC signal from AGC amplifier, 234, as will be explained in more detail below. The color difference signals from video shaping network 254 are applied to color difference amplifier 233 and then to matrix 222 for combination with the luminance signal, from which the signal is passed to display tube 224.

FIG. 13 shows a circuit for modifying the frequency characteristics of each of the color difference signals in accordance with the strength of the received signal. The output from chrominance demodulator 228 is, as shown, the color difference signals, R-Y, G-Y, and B-Y. These signals are applied to video shaping network 254 which includes an individual shaping network for each of the color difference signals. Each of these networks are arranged for selectively controlling the frequency response of the color difference signals and can be any of the circuits previously described to provide such a function. One such circuit, as shown in FIG. 2 will provide this function and accordingly the video shaping networks are given reference numerals 28a, 28b, and 28c to indicate that the network 28 shown in FIG. 2 is utilized.

The operation of networks 254 can be understood by referring to FIG. 14 which is a graphical representation of the frequency response of one color difference signal, R-Y, however, the response of each of the color difference signals in the video shaping network is similar. With a strong signal, the AGC signal has little affect on the capacitance of the capacitance element diode and therefore little affect upon the frequency response of each of the color difference signals. When the weak signal is received, the AGC signal increases the capacitance of the variable capacitance diode and thereby attenuates the high frequency components of each of the color difference signals so as to eliminate the high frequency noise from these signals.

In summary, the present invention provides an automatic sharpness control which is utilizable to control the sharpness of the image displayed in a television tube or the like. The present invention is applicable both to black and white television receivers and to color television receivers in that improved display is provided without the requirement of viewer adjustment or complex circuitry.

Obviously, other modifications of the present invention are possible in light of the above teachings. Thus, the AGC signal may vary in any predetermined manner, i.e., may increase or decrease responsive to the received signal as may be desired. The AGC may also be arranged to provide a "threshold" response so that no adjustment occurs until the AGC signal reaches a predetermined level. Similarly, the AGC responsive impedance elements, whether they be capacitors, resistors or inductors, may be voltage dependent or current dependent depending, of course, on the type of AGC signal utilized. In fact, the AGC signal may be utilized to control transistor elements or the like in order to control the sharpness of the television picture tube. Accordingly, the embodiments heretofore described are merely exemplary of the principles of the present invention and numerous other embodiments may be devised within the spirit and scope of the present invention as delineated by the appended claims.

What I claim is:

1. In a color television receiver responsive to color television signals and including means for receiving said color television signals, means for demodulating said color television signals to provide video signals, means coupled to receive said video signals for separating said video signals into a luminance signal component and a chrominance signal component and means responsive to said video signals for providing an AGC signal having a strength related to the strength of said video signals, the combination of a first video shaping means, means coupling said AGC signal to said first video shaping means to control the response thereof, means coupling said luminance signal component of said video signal to said first video shaping means, a second video shaping means, means coupling said AGC signal to said second video shaping means to control the response of said second video shaping means, means coupling said chrominance signal component to said second video shaping means, said first and second video shaping means being responsive to the strength of said AGC signal for automatically varying the frequency content of said luminance and chrominance signal components of said video signal.

2. The invention according to claim 1 further including a chrominance demodulator means responsive to said chrominance signal component for separating said chrominance signal component into a plurality of color difference signals, said second video shaping means being responsive to said color difference signals and said AGC signal to automatically vary the frequency content of said color difference signals in accordance with the strength of said AGC signal.

3. The invention according to claim 2 wherein said first and second video shaping means includes a variable impedance element responsive to the strength of said AGC signal.

4. In a color television system responsive to color television signals and including means for receiving said color television signals, means for demodulating said color television signals to provide video signals, means coupled to receive said video signals for separating said video signals into a luminance signal component and chrominance signal component, means responsive to said video signals for providing an AGC signal having a strength which varies according to the strength of said video signals, a display device responsive to said signals for providing a color television picture display, a system for automatically varying the sharpness of the picture displayed on the display device including a first video shaping means, means for coupling said AGC signal in controlling relationship to said first video shaping means, means for coupling said luminance signal to said first video shaping means, a second video shaping means, means for coupling said AGC signal in controlling relationship to said second video shaping means, means for coupling said chrominance signal component to said second video shaping means, said first and second video shaping means controlling the luminance and chrominance signal components respectively in accordance with the strength of said AGC signal to increase the sharpness of the image displayed on the display device when said AGC signal strength increases and to decrease the sharpness of the image displayed on the display device when the strength of said video signal decreases.

5. An automatic sharpness control for use in a television receiver comprising means for receiving television signals, means responsive to said received television signals for demodulating the received signals and providing a video signal, means responsive to said video signals for separating said video signals into a luminance and a chrominance signal component, means responsive to said video signals for providing an AGC signal responsive to the amplitude of said received signal, a display device, means for applying said luminance signal component and chrominance signal component of said color video signal to said display device including first and second video shaping means coupled to receive said AGC signal, means for applying said luminance signal to said first video shaping means and means for applying said chrominance signal to said second video shaping means, said AGC signal automatically varying the response of each of said video shaping means to independently control the frequency content of said luminance signal component and said chrominance signal component in response to the strength of said AGC signal for controlling the sharpness of the image displayed on said display device.

* * * * *